US006356892B1

United States Patent
Corn et al.

(10) Patent No.: US 6,356,892 B1
(45) Date of Patent: Mar. 12, 2002

(54) EFFICIENT IMPLEMENTATION OF LIGHTWEIGHT DIRECTORY ACCESS PROTOCOL (LDAP) SEARCH QUERIES WITH STRUCTURED QUERY LANGUAGE (SQL)

(75) Inventors: Cynthia Fleming Corn; Larry George Fichtner; Rodolfo Augusto Mancisidor; Shaw-Ben Shi, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/160,022

(22) Filed: Sep. 24, 1998

(51) Int. Cl.[7] .............................................. G06F 17/30
(52) U.S. Cl. ................. 707/3; 707/4; 707/103
(58) Field of Search ............................ 707/2, 4, 3, 104, 707/20; 709/217, 218, 219, 202

(56) References Cited

U.S. PATENT DOCUMENTS

| 5,379,419 | A | * | 1/1995 | Heffernan et al. .............. 707/4 |
| 5,412,804 | A | * | 5/1995 | Krishna .......................... 707/2 |
| 5,537,590 | A | | 7/1996 | Amado |
| 5,584,024 | A | * | 12/1996 | Shwartz .......................... 707/4 |
| 5,600,831 | A | * | 2/1997 | Levy et al. ...................... 707/2 |
| 5,668,987 | A | | 9/1997 | Schneider |
| 5,701,400 | A | | 12/1997 | Amado |
| 5,864,842 | A | * | 1/1999 | Pederson et al. ............... 707/3 |
| 5,907,837 | A | * | 5/1999 | Ferrel et al. .................... 707/3 |
| 5,956,706 | A | * | 9/1999 | Carey et al. .................... 707/2 |
| 5,963,933 | A | * | 10/1999 | Cheng et al. ................... 707/2 |
| 5,995,961 | A | * | 11/1999 | Levy et al. ...................... 707/4 |
| 6,009,428 | A | * | 12/1999 | Kleewein et al. ............. 707/10 |
| 6,016,499 | A | * | 1/2000 | Ferguson .................... 707/104 |
| 6,052,681 | A | * | 4/2000 | Harvey .......................... 707/3 |
| 6,055,562 | A | * | 4/2000 | Devarakonda et al. ....... 709/202 |
| 6,085,188 | A | * | 7/2000 | Bachmann et al. ............ 707/3 |
| 6,092,062 | A | * | 7/2000 | Lohman et al. ................ 707/2 |
| 6,199,062 | B1 | * | 3/2001 | Byrne et al. ................... 707/3 |

* cited by examiner

Primary Examiner—Kim Vu
Assistant Examiner—Anh Ly
(74) Attorney, Agent, or Firm—Winstead Sechrest & Minick P.C.; Jeffrey S. LaBaw

(57) ABSTRACT

A method of hierarchical LDAP searching in an LDAP directory service having a relational database management system (DBMS) as a backing store. The method begins by parsing an LDAP filter-based query for elements and logical operators of the filter query. For each filter element, the method generates an SQL subquery according to a set of translation rules. For each SQL subquery, the method then generates a set of entry identifiers for the LDAP filter query. Then, the SQL subqueries are combined into a single SQL query according to a set of combination rules chosen corresponding to the logical operators of the LDAP filter query.

29 Claims, 5 Drawing Sheets

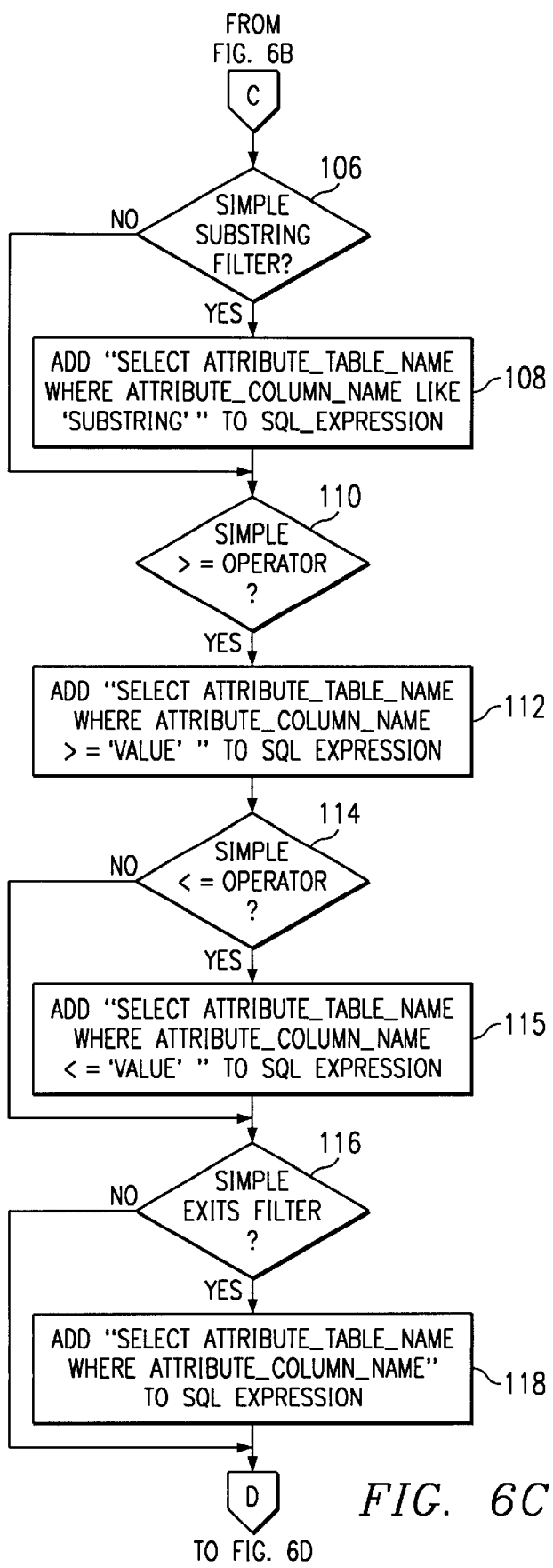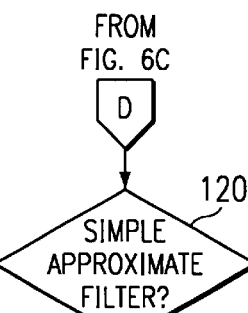
FIG. 6C
FIG. 6D

EFFICIENT IMPLEMENTATION OF LIGHTWEIGHT DIRECTORY ACCESS PROTOCOL (LDAP) SEARCH QUERIES WITH STRUCTURED QUERY LANGUAGE (SQL)

This application includes subject matter protected by copyright. All rights are reserved.

BACKGROUND OF THE INVENTION

1. Technical Field

This invention relates generally to providing directory services in a distributed computing environment.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of qualifiers including attribute name, attribute value and Boolean operators like AND, OR and NOT. Users can use the filter to perform complex search operations. One filter syntax is defined in RFC 2254.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

One of main goals for implementing an LDAP directory service with an relational database backing store (e.g., DB/2) is to provide a design and implementation such that all LDAP search queries can be executed efficiently with SQL. Implementing LDAP search queries with SQL, however, is a non-trivial task. On the one hand, because both LDAP and SQL use the same AND, OR and NOT logical operators, one possible solution to implementing LDAP search queries with SQL might simply involve mapping each LDAP operator to its corresponding SQL operator. This approach, however, does not work well in practice. Another approach, characterized by known prior art implementations (e.g., the Netscape b-tree LDAP server), involves retrieval of a superset of candidate entries, together with post-processing on those entries. There are several problems with this technique. The two-step process is time consuming. More problematic, however, is that negation and existence queries give rise to a sequential search through the whole database. For a LDAP directory with a large number of entries, search results cannot be returned in an efficient manner.

The present invention addresses the problem of efficiently mapping an LDAP filter into an SQL query.

BRIEF SUMMARY OF THE INVENTION

It is a primary object of this invention to provide a method for searching a relational database using hierarchical, filter-based queries, such as LDAP.

Another primary object is to provide an algorithm that combines basic LDAP filter expressions into a preferably single SQL query that retrieves target entries that exactly match given search criteria.

Still another important object of this invention is to provide a mechanism that can map even complicated LDAP queries having infinite logical depth into SQL to facilitate a relational database search.

Yet another important object of this invention is to map LDAP logical operators efficiently for use in an LDAP relational database search mechanism.

A more specific object of this invention is to efficiently implement LDAP search queries with SQL wherein simple queries are combined together to form an arbitrary complex query that can retrieve target entries, preferably with no post-processing involved.

It is also an object of the present invention to provide a method for mapping LDAP search queries into an SQL query that is efficient and does not degenerate into a sequential search.

It is another more specific object of the present invention to provide a recursive algorithm that can deal with LDAP filter operators in a consistent way, and that deals with complicated LDAP queries with infinite number of logical operators.

A more general object of this invention is to provide hierarchical LDAP searches using relational tables in an LDAP directory service having a relational database management system (DBMS) as a backing store.

A more general object of this invention is to provide a reliable and scaleable enterprise directory solution, wherein a preferred implementation is LDAP using a DB/2 backing store.

The present invention solves the problem of efficiently mapping an LDAP filter into an SQL query using unique entry identifier (EID) sets. According to the inventive method, a SQL subquery is first generated for each LDAP operator based on given translation rules. The SQL subquery generates a set of entry EIDs that match the LDAP basic operation. Thereafter, the SQL subqueries are combined into a single SQL query according to a set of combination rules chosen corresponding to the logical operators of the LDAP filter query. Thus, for example, if the LDAP logical operator is OR(|), the invention then preferably uses an SQL UNION to union the sets generated from the subquery. If the LDAP logical operator is AND (&), the invention preferably uses an SQL INTERCEPT to intercept the sets generated from the subquery. If the LDAP logical operator is NOT, the invention preferably excludes entries by negating the IN operation before the subquery. Thus, the combination rules includes, for example, mapping the LDAP logical OR operation to an SQL UNION, mapping the LDAP logical operation AND to SQL INTERCEPT, and mapping the LDAP logical operation NOT to SQL NOT IN.

Generalizing, according to the preferred embodiment, a method for searching a relational database using hierarchical, filter-based queries begins by parsing a filter-based query for elements and logical operators of the filter query. For each filter element, the method generates an SQL subquery according to a set of translation rules. For each SQL subquery, the method then generates a set of entry identifiers for the filter query. Then, the SQL subqueries are combined into a single SQL query according to a set of combination rules chosen corresponding to the logical operators of the filter query.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIGS. 6A–6D are a detailed composite flowchart of a preferred embodiment of the inventive recursive algorithm of the invention that is used to generate the SQL query.

DETAILED DESCRIPTION OF THE PREFERRED EMBODIMENT

Figure 1:
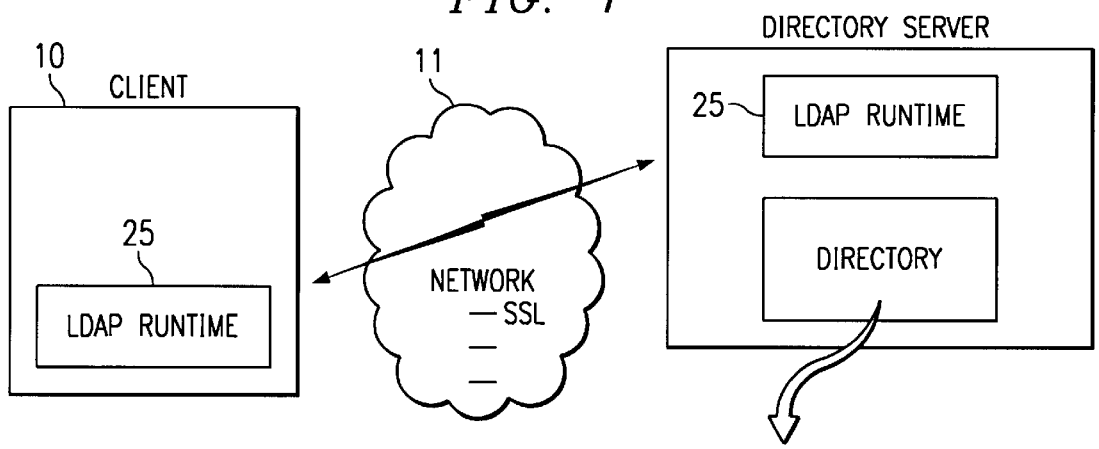
FIG. 1 is a representative LDAP directory service implementation.
Figure 2:
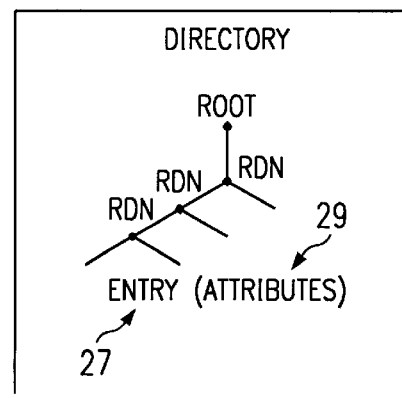
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the "scope" supported by LDAP search are: base, one level and subtree. LDAP does not support search for arbitrary tree levels and path enumeration.

Figure 3:
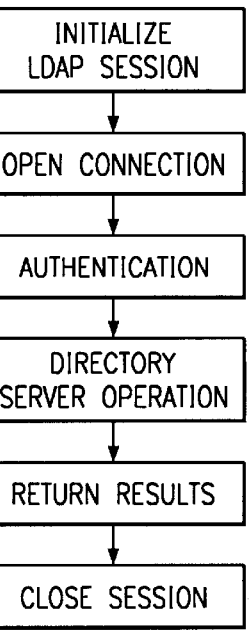
FIG. 3 is a flowchart of an LDAP directory session.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle may allow multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

Figure 4A:
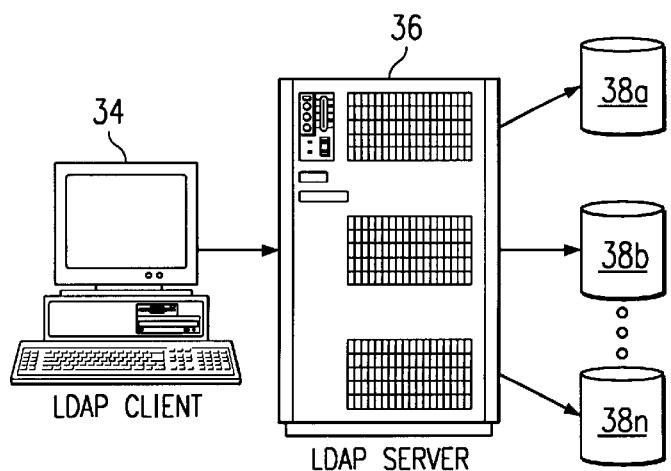
FIGS. 4A–4C show representative LDAP directory service implementations having relational database backing store.
Figure 4B:
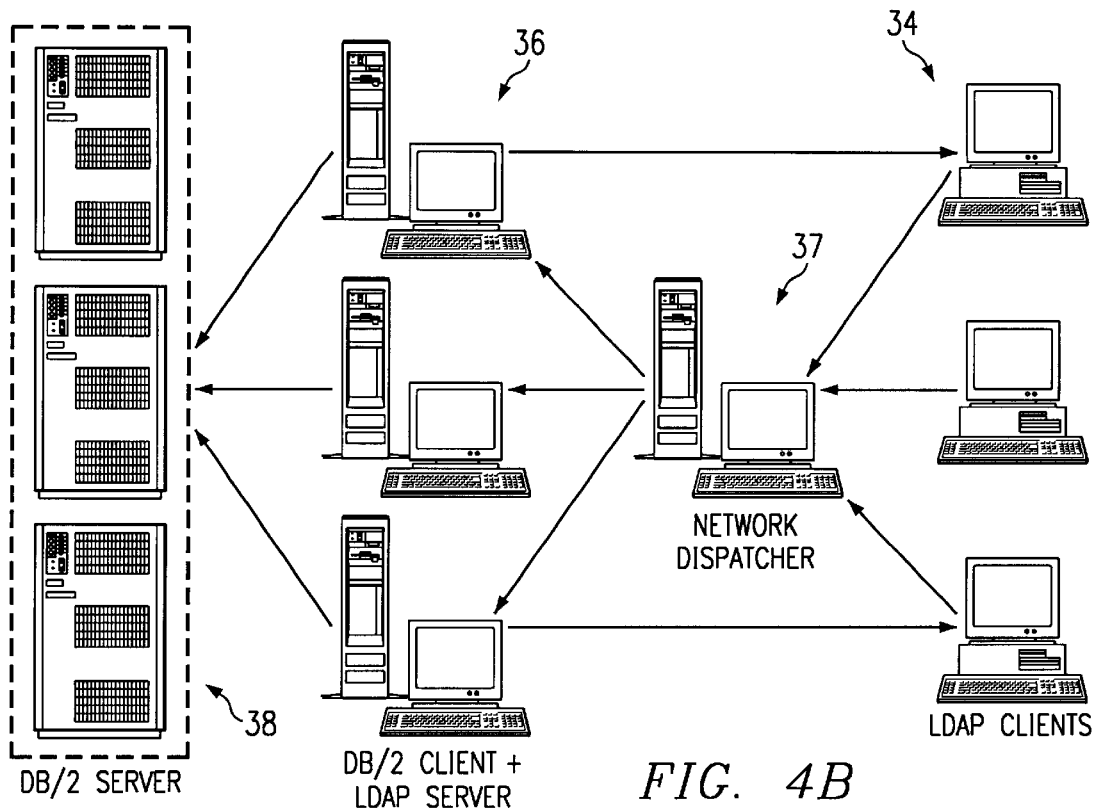
Figure 4C:
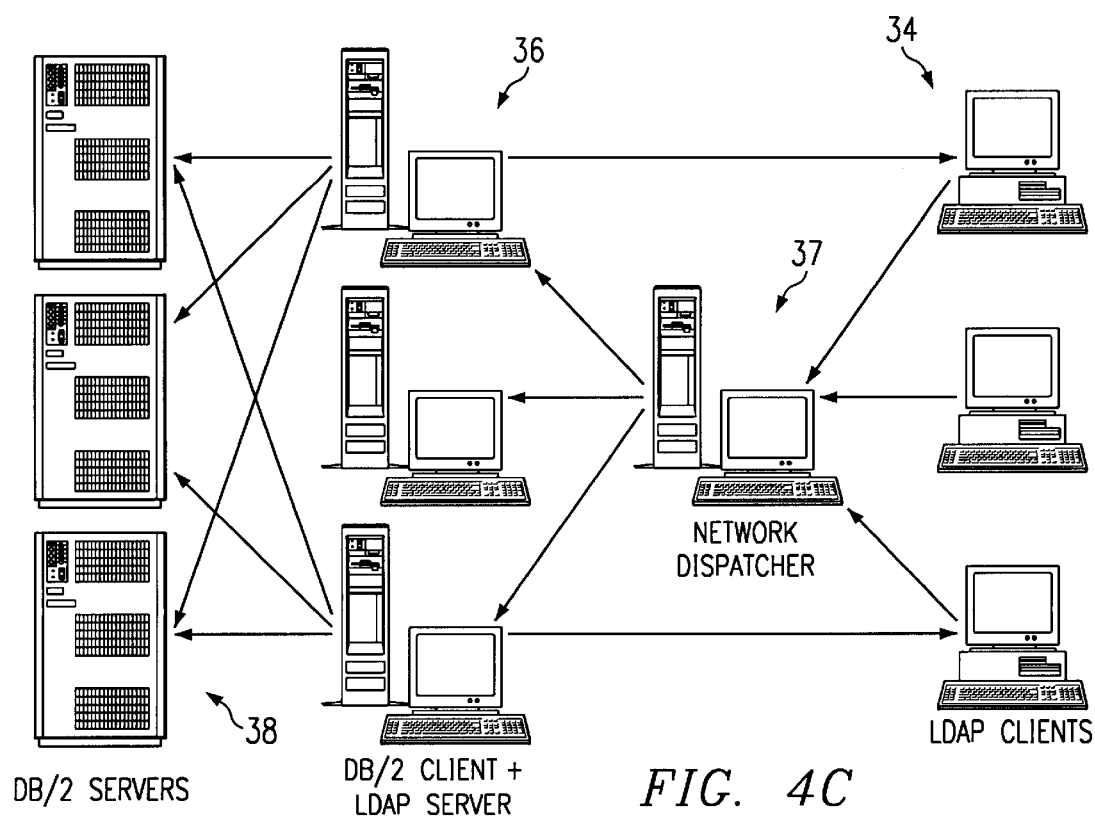

It may be desirable to store LDAP directory data in a backing store. FIGS. 4A–4C illustrates several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a–58n through an LDAP server 36. The databases 38a–38n contain the directory information. However, from the user's perspective, the LDAP server 36 stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

FIG. 4C illustrates a multiple client/parallel super server configuration. In certain environments, where users need to store large amounts of information into the directory, this configuration automatically partitions the database into different machines 38. In addition, database queries are divided into smaller, independent tasks that can execute concurrently, which increases end user query response time. This configuration enables users to store up to terabytes of data into the database.

One of ordinary skill should appreciate that the system architectures illustrated in FIGS. 4A–4C are not to be taken as limiting the present invention. The inventive technique may be used to search any relational database using hierarchical, filter-based database queries.

Figure 5:
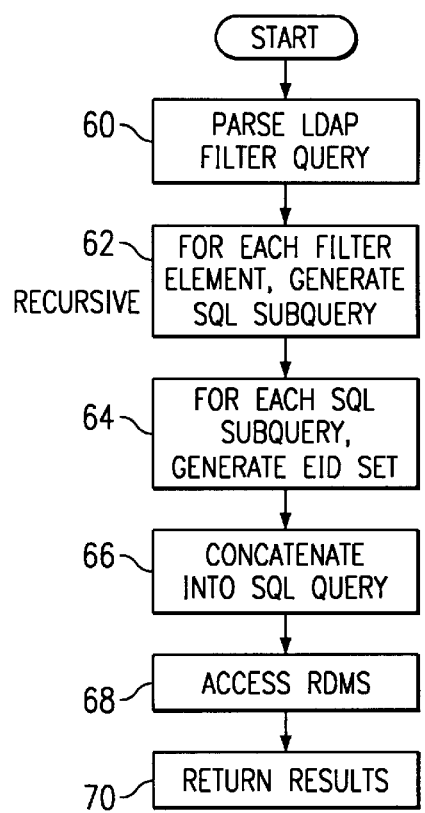
FIG. 5 is a simplified flowchart of the inventive method for hierarchical LDAP searching in an LDAP directory service having a relational database management system as a backing store using LDAP filter queries mapped efficiently to SQL.

The technique is now described generally with reference to the flowchart of FIG. 5. This diagram illustrates the basic method of the invention to provide hierarchical LDAP searching in an LDAP directory service having a relational database management system (DBMS) as a backing store. The method begins at step 60 by parsing an LDAP filter-based query for elements and logical operators of the filter query. For each filter element, the method continues at step 62 to generate an SQL subquery according to a set of translation rules, which will be defined below. For each SQL subquery, the method then continues at step 64 to generate a set of unique entry identifiers for the LDAP filter query. Then, at step 66, the SQL subqueries are combined into a single SQL query according to a set of combination rules chosen corresponding to the logical operators of the LDAP filter query. At step 68, the single SQL query is applied to the database step. Results are returned at step 70.

The specific details of the routine illustrated in FIG. 5 are now described. By way of brief background, the inventive scheme preferably takes advantage of several LDAP table structures that are now described below. Further details about these structures are provided in U.S. Ser. No. 09/050,503 titled "A Fast And Efficient Method To Support Hierarchical LDAP Searches With Relational Tables", assigned to the assignee of this application, and incorporated herein by reference.

Entry Table

This table holds the information about a LDAP entry. This table is used for obtaining the EID of the entry and supporting LDAP_SCOPE_ONELEVEL and LDAP_SCOPE_BASE search scope.

EID. The unique identifier of the LDAP entry. This field is indexed.

PEID. The unique identifier of a parent LDAP entry in the naming hierarchy.

EntryData. Entries are stored using a simple text format of the form "attribute: value". Non-ASCII values or values that are too long to fit on a reasonable sized line are represented using a base 64 encoding. Giving an ID, the corresponding entry can be returned with a single SELECT statement.

Descendant Table

The purpose of this table is to support the subtree search feature of LDAP. For each LDAP entry with an unique ID (AEID), this table contains the descendant entries unique identifiers (DEID). The columns in this table are:

AEID. The unique identifier of the ancestor LDAP entry. This entry is indexed.

DEID. The unique identifier of the descend LDAP entry. This entry is indexed.

Attribute Table

One table per searchable attribute. Each LDAP entry is assigned an unique identifier (EID) by the backing store. The columns for this table are:

EID

Attribute value

Thus, in the parent table, the EID field is the unique identifier of an entry in the LDAP naming hierarchy. The PEID field is the unique identifier of the parent entry in the naming hierarchy. In the descendant table, the AEID field is the unique identifier of a ancestor LDAP entry in the LDAP naming hierarchy. The DEID field is the unique identifier of the descend LDAP entry.

In addition to the table structures described above, the following SQL SELECT statements are used by LDAP/DB2 search routines:

Base Level Search:
    SELECT entry.EntryData,
from ldap_entry as entry
where entry.EID in (
    select distinct ldap_entry.EID
    from <table list>
    where (ldap_entry.EID=<root dn id> )
    <sql where expressions>)
One Level Search:
    SELECT entry.EntryData,
    from ldap_entry as entry
    where distinct ldap_entry.EID
    from ldap_entry, <table list>
        ldap_entry as pchild, <list of tables>
        where ldap_entry.EID=pchild.EID
        AND pchild.PIED=<root dn id>
        <sql where expressions>)
Subtree Search
    SELECT entry.EntryData,
    from ldap_entry as entry
    where entry.EID in (
        select distinct ldap_entry.EID
        from ldap_entry, ldap_desc, <table list>
        where
        (LDAP_ENTRY.EID=ldap_desc.DEID AND
        ldap_desc.AEID=<root dn id>)
        ldap_entry as pchild. <table list>
        where ldap_entry.EID=ldap_desc.EID
        AND ldap_desc.AEID=%d <where expressions>).

In the above representation, <table list> and <where expression> are the two null terminated strings returned by the SQL generator. The <root dn id> is the unique identifier of the root dn. The where clause should only be generated if <where expression> is not the empty string and no errors where detected in the parsing the LDAP filter.

As is well-known, LDAP search queries comprise six basic filters with the format <attribute> <operator> <value>. Complex search filters are generated by combining basic filters with Boolean operators AND (&), OR (|) and NOT (!).

Translation Rules

As described above in the flowchart of FIG. 5, an SQL subquery is generated for each LDAP filter element according to a set of translation rules. This was step 62 in the method. The following sets forth preferred translation rules used to generate SQL queries for basic LDAP filters according to the present invention:

Equality
   LDAP filter
     (<attr> = <value>)
   SQL Expression
     WHERE columnname = 'value'
Ranges:
   LDAP filter
     (<attr> = <value>)
     (<attr> = <value>)
   SQL Expression
     WHERE columnname = 'value'
     WHERE columnname = 'value'
Substring:
   LDAP filter
     (<attr> = ·<leading>"*·any"*·<trailing>")
   SQL Expression
     WHERE columnname
     LIKE ·<leading>"*·any"*·<trailing>"
Approximate:
   LDAP filter
     (<attr> = <value>)
   SQL Expression
     WHERE SOUNDEX (columnname) = SOUNDEX ('value')

As described above, according to the inventive method, for each LDAP filter element or sub-expression, there is a set of entries (EIDs) that will satisfy the element. Thus, each element generally maps to a set of EIDs. The EID sets are then merged together, preferably into a single SQL query, using a set of combination rules. Thus, if a pair of LDAP filter elements are subject to an LDAP logical OR operator, the corresponding EID sets are merged using an SQL UNION logical operator. If a pair of LDAP filter elements are subject to an LDAP logical AND operator, the corresponding EID sets are merged using an SQL INTERSECT logical operator. If a pair of LDAP filter elements are subject to an LDAP logical NOT operator, the corresponding EID sets are merged using an SQL NOT IN logical operator. As will also be seen, these combination rules are applied recursively such that all LDAP elements associated with a particular logical operator are processed into the SQL query. This recursive processing facilitates handling of even complicated LDAP queries having numerous layers of logical depth.

With the basic translation rules and the EID sets approach, the present invention thus uses a recursive algorithm that handles complicated queries with a large number of layers of logical operators. The SQL generation algorithm of the present invention is illustrated in the composite flowchart of FIGS. 6A–6D. Note that the algorithm presented may be applied to search queries for all levels.

Figure 6A:
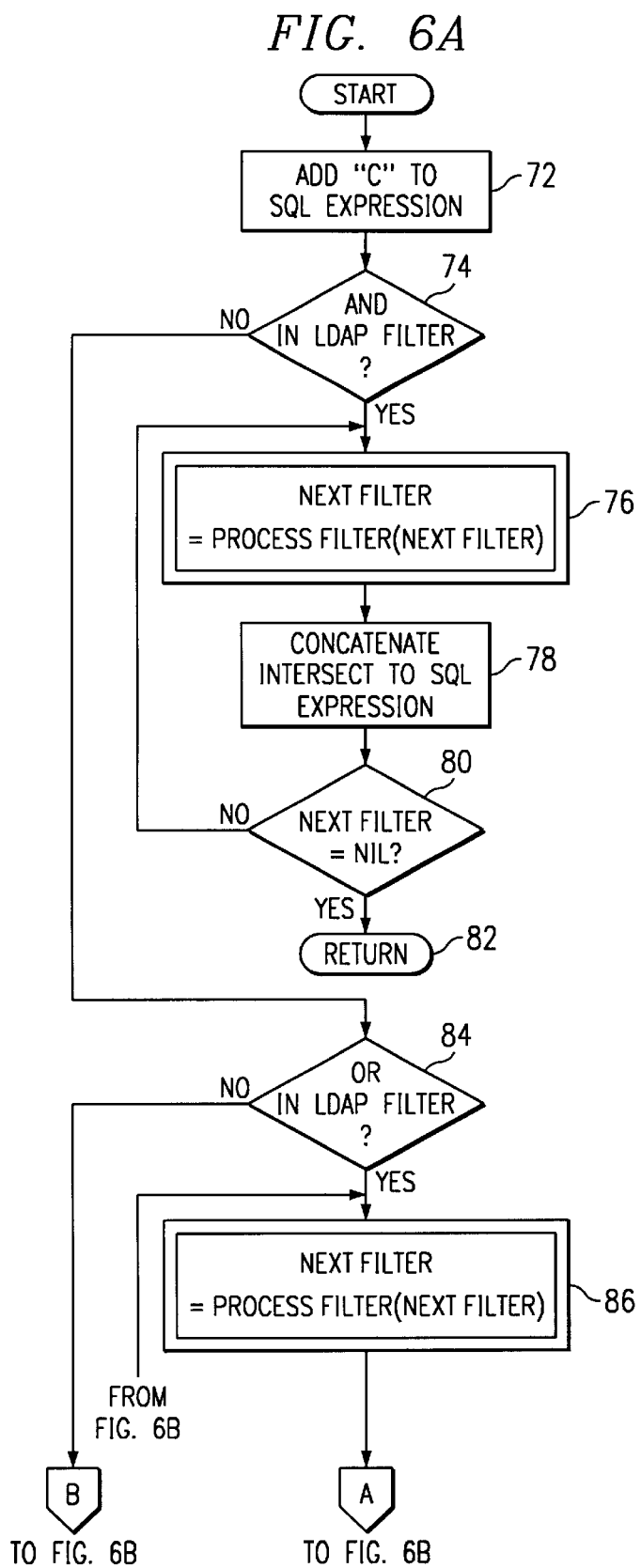

With reference to FIG. 6A, the method begins at step 72 by concatenating "(" to the generated SQL query (which, in the first iteration, is otherwise a skeleton query). The routine then tests at step 74 to determine whether the LDAP filter element includes the AND logical operator. If the outcome of the test at step 74 is positive, the AND logical operator is present. Typically, an AND logical operator sets apart at least a pair of subexpressions, and thus the routine includes appropriate logic to handle each subexpression separately in a recursive manner. To this end, the routine continues at step 76 and sets an process variable nextFilter equal to ProcessFilter(nextFilter). At step 78, the routine concatenates the SQL INTERSECT operator to the SQL query. This step maps the LDAP AND logical operator in the manner previously described. At step 80, a test is made to determine whether nextFilter is nil, i.e. whether all subexpressions associated with the AND logical operator in the LDAP filter have been processed. If not, the routine returns at step 82. If, however, the outcome of the test at step 80 is negative, the routine loops back to step 76 to process the next subexpression associated with the AND logical operator currently being mapped.

If the outcome of the test at step 74 is negative, which indicates that the AND logical element is not in the filter element, the routine branches to step 84 to determine whether the LDAP OR logical operator is present. If the outcome of the test at step 84 is negative, the routine branches to FIG. 6B. If, however, the outcome of the test at step 84 is positive, the routine continues at step 86 with a recursive call into the ProcessFilter(nextFilter) subroutine previously described. Just as with the AND logical operator, an OR logical operator will typically include subexpressions that must be processed in a recursive manner.

Figure 6B:
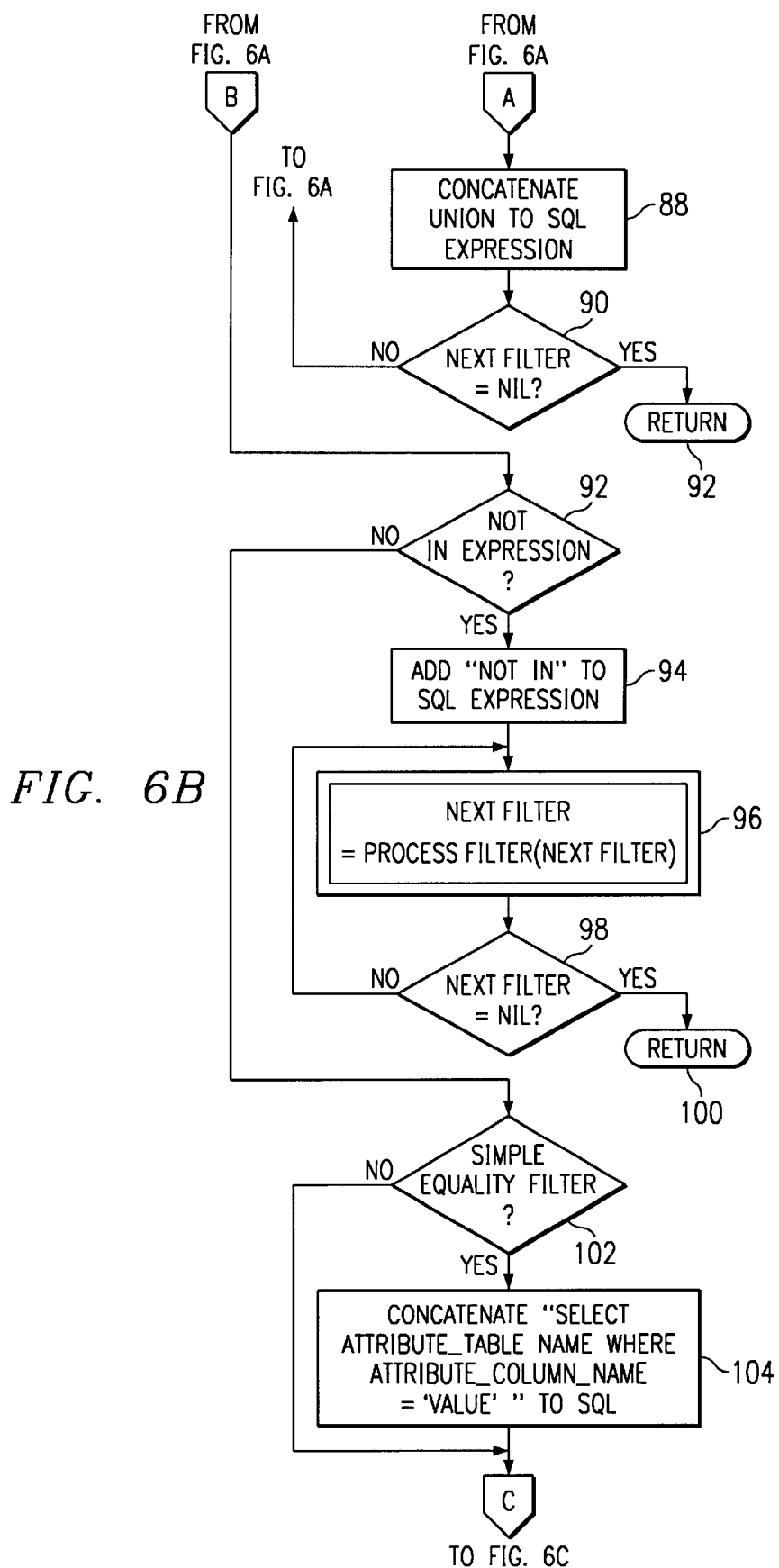

With reference now to FIG. 6B, the routine then continues at step 88 to concatenate the SQL UNION operator into the SQL query. At step 90, a test is performed to determine whether there are any more subexpressions to test. If not, the routine returns at step 92. If, however, the outcome of the test at step 90 is negative, the routine loops back to step 86 to process the next subexpression associated with the OR logical operator currently being mapped.

If the LDAP filter element includes neither AND nor OR, the routine continues at step 92 to determine whether the NOT logical operator is present. If so, the routine continues at step 94 to add the NOT IN logical operator to the SQL expression being generated. The routine then continues at step 96 to enter the recursive call so that all associated subexpressions may be parsed through the algorithm in the manner previously described. Thus, at step 98, a test is performed to determine whether all subexpressions associated with the NOT operator have been processed. If so, the routine returns at step 100; otherwise, the routine loops back to step 96 and processes the next subexpression.

The remainder of the flowchart describes the mapping of simple filter elements using the set of translation rules previously described. At step 102, a test is made to determine whether the LDAP filter includes a simple equality statement (e.g., "a=1"). If so, the routine continues at step 104 to concatenate the associated attribute column name value into the SQL query. Thereafter, or if the result of the test at step 102 is negative, the routine continues in FIG. 6C.

At step 106, a test is made to determine whether the LDAP filter element is a substring filter. If so, the routine continues at step 108 to concatenate the associated attribute column name value into the SQL query. Thereafter, or if the result of the test at step 106 is negative, the routine continues at step 110 to determine whether the LDAP filter element is a greater than or equal expression. If so, the routine continues at step 112 to concatenate the associated attribute column name substring value into the SQL query being constructed. Thereafter, the routine continues at step 114 to determine whether the LDAP filter element is a less than or equal to expression. If so, the routine concatenates the associated value into the SQL expression at step 115 and continues at step 116. Step 116 is reach also as a result of a negative outcome of step 114.

At step 116, a test is performed to determine whether the LDAP filter expression is a simple exists filter. If so, the routine concatenates the associated value into the SQL expression at step 118. The routine then continues with step 120 in FIG. 6D, which is also reached by a negative outcome to the test at step 116. Step 120 tests whether the LDAP filter includes the simple approximate filter. If so, the appropriate value is concatenated into the SQL query at step 122. At step 124, the SQL query is closed by concatenating an ")" value to complete the processing.

The following is a detailed listing of a preferred code implementation of the above-described recursive algorithm:
BEGIN PROCESSFILTER ALGORITHM ON AN LDAP-FILTER.
　　CONCATENATE "(" TO SQL-EXPRESSION.
　　　　DO ONE OF THE FOLLOWING DEPENDING ON THE TYPE OF
　　　　LDAP FILTER:
　　1) For complex ldap_filter with an AND operation:
SET NEXTFILTER = LDAP-FILTER1
LOOP UNTIL NEXTFILTER IS EMPTY
　　SET NEXTFILTER - PROCESSFILTER (NEXTFILTER)
　　CONCATENATE" INTERSECT" TO SQL-EXPRESSION.
END OF LOOP
　　2) For complex ldap-filter with an OR operation:
SET NEXTFILTER - LDAP-FILTER1
LOOP UNTIL NEXTFILTER IS EMPTY
　　SET NEXTFILTER - PROCESSFILTER (NEXTFILTER)
　　CONCATENATE" UNION" TO SQL-EXPRESSION.
END OF LOOP
　　3) For complex ldap-filter with a NOT operation:
ADD " NOT " TO SQL-EXPRESSION.
　　PROCESSFILTER (LDAP-FILTER1)
　　4) For simple equality filter:
CONCATENATE "SELECT ATTRIBUTE_TABLE_NAME WHERE
　　ATTRIBUTE_COLUMN_NAME = 'VALUE' "
　　TO SQL-EXPRESSION.
　　5) For simple substring filter:
CONCATENATE "SELECT ATTRIBUTE_TABLE_NAME WHERE
　　ATTRIBUTE_COLUMN_NAME LIKE' SUBSTRING' "
　　TO SQL-EXPRESSION.
　　6) For simple greater or equal filter:
CONCATENATE "SELECT ATTRIBUTE_TABLE_NAME WHERE
　　ATTRIBUTE_COLUMN_NAME>= 'VALUE' "
　　TO SQL-EXPRESSION.
　　7) For simple less or equal filter:
CONCATENATE "SELECT ATTRIBUTE_TABLE_NAME WHERE
　　ATTRIBUTE_COLUMN_NAME <= 'VALUE' "
　　TO SQL-EXPRESSION.
　　8) For simple attribute exists filter:
CONCATENATE "SELECT ATTRIBUTE_TABLE_NAME"
　　TO SQL-EXPRESSION.
　　9) For simple approximate filter:
CONCATENATE "SELECT ATTRIBUTE_TABLE_NAME WHERE
　　SOUNDEX (ATTRIBUTE_COLUMN_NAME) = SOUNDEX ('VALUE')"
　　TO SQL-EXPRESSION.
　　Concatenate ")" to SQL-expression.
　　Return next - ldap-filter.
End processFilter algorithm.

EXAMPLES

With the basic translation rules and the EID sets approach described in the flowcharts of FIG. 5 and FIGS. 6A–6D, the following are the SQL queries that the invention generates for a representative LDAP filter query of the following form (|(f1='v1') (f2='v2')):
Alternative 1
　　SELECT entry.EntryData
　　FROM LDAP_ENTRY as entry
　　WHERE entry.EID in
　　(
　　SELECT distinct LDAP_ENTRY.EID
　　FROM ldap_entry, ldap_desc, f1
　　WHERE
　　　　(ldap_entry.EID=ldap_desc.DEID AND
　　　　ldap_desc_AID=<id>) AND
　　　　ldap_entry.eid=f1.eid AND
　　　　f1='v1')
　　UNION
　　SELECT distinct ldap_entry.EID
　　FROM ldap_entry, ldap_desc, f2
　　WHERE (ldap_entry.EID=ldap+desc.DEID ADND
　　　　ldap_desc.AEID=<id>)
　　AND ldap_entry.EID=f2.eid
　　AND f2='v2'))
Alternative 2
　　SELECT entry.EntryData
　　FROM LDAP_ENTRY as entry WHERE entry.EID in
　　( SELECT distinct LDAP_ENTRY.EID FROM
　　　　LDAP_ENTRY,ldap_desc
　　WHERE
　　(LDAP_ENTRY.EID=ldap_desc.DEID AND ldap_desc.AEID=<id>)
　　AND LDAP_ENTRY.EID
　　IN ((SELECT EID FROM f1 WHERE f1 = ' v1')
　　UNION (SELECT EID FROM SN WHERE SN =' v2' )))

Both SQL statements illustrated above generate the correct search results, and both techniques are within the scope of the present invention. As can be seen, the first query performs the JOIN operation with the ldap descendant table within each subquery. The second query performs the JOIN operation with the ldap descendant table outside the subquery. Although either alternative may be used to implement the present invention, Alternative 2 may provide better performance results. In addition to correct results, the OR operation (illustrated above) performs well with both alternative techniques because irrelevant entries are filtered out in the subquery and target entries are reported back to the main query.

As noted above, with the set-based approach of the present invention, the LDAP NOT operation preferably is performed by excluding entries through negating the IN operation before the subquery. The following example illustrates the operation:

Filter String:

(!(f1='v1'))

SQL Statement:

SELECT entry.EntryData,
FROM LDAP_ENTRY as entry
WHERE entry.EID in
( SELECT distinct LDAP_ENTRY.EID FROM
   LDAP_ENTRY.ldap_desc
WHERE (LDAP_ENTRY.EID=ldap_desc.DEID AND
   ldap_desc.AEID=<id>)
AND LDAP_ENTRY.EID NOT IN ((SELECT EID
   FROM f1
   where f1=' v1')))

The following is another example of a SQL statement generated for complex query with AND, OR and NOT operator.

Complex Query with AND, OR and NOT Operator

Filter String:

(&(| (objectclass=PERSON) (objectclass=GROUP)) (sn=SMITH) (!(member=*)))

SQL Statement:

SELECT entry.EntryData,
FROM LDAP_ENTRY as entry WHERE entry.EID in
( SELECT distinct LDAP_ENTRY.EID FROM
   LDAP_ENTRY,ldap_desc
WHERE (LDAP_ENTRY.EID=ldap_desc.DEID AND
   ldap_desc.AEID=?) AND
LDAP_ENTRY.EID
IN (((SELECT EID FROM OBJECTCLASS WHERE
   OBJECTCLASS =
PERSON)
UNION (SELECT EID FROM OBJECTCLASS
   WHERE OBJECTCLASS =
GROUP))
INTERSECT (SELECT EID FROM SN WHERE SN =
   SMITH )
   INTERSECT
(SELECT EID FROM LDAP_ENTRY WHERE EID
   NOT IN
(SELECT EID FROM MEMBER))))

It should be noted that the subtree search level is illustrated in the examples herein, but only for purposes of illustration. This should not be taken by way of limitation.

As noted above, the invention may be implemented in any hierarchical directory service in which a relational database management system (RDBMS) is used to provide a backing store function. Thus, for example, the principles of the invention may be carried out in an X.500 directory service or hereinafter-developed LDAP implementations. The SQL query generated according to the present invention is used to access the relational database, and results are then returned in response to this query. The invention may also be implemented within a relational database management system being used as an add-on to a directory service. One of ordinary skill will appreciate that the invention can be applied to any relational database management system (RDBMS) and not simply DB/2, the implementation described above. Thus, for example, the relational database may be Oracle, Sybase or any other third party supplied backing store. In addition, the EID sets approach can also be applied to b-tree based LDAP server implementation.

Moreover, although the preferred embodiment has been described in the context of generating a Structured Query Language (SQL) query, the inventive technique should be broadly construed to extend to any relational database query language.

One of the preferred embodiments of the routines of this invention is as a set of instructions (computer program code) in a code module resident in or downloadable to the random access memory of a computer.

Having thus described our invention, what we claim as new and desire to secure by Letters Patent is set forth in the following claims.

What is claimed is:

1. A method for searching a relational database using hierarchical, filter-based queries, comprising the steps of:

parsing a filter-based query for elements and logical operators of the filter query;

for each filter element, generating an SQL subquery according to a set of translation rules;

for each SQL subquery, generating a set of entry ID's for the filter query; and combining the SQL subqueries into a single SQL query according to a set of combination rules chosen corresponding to the logical operators of the filter query.

2. The method as described in claim 1 wherein the filter-based query is a Lightweight Directory Access Protocol (LDAP) directory service query.

3. The method as described in claim 2 wherein the logical operators of the LDAP filter-based query include AND, OR and NOT.

4. The method as described in claim 3 wherein the combination rules map the OR logical operator to an SQL UNION operator.

5. The method as described in claim 3 wherein the combination rules map the AND logical operator to an SQL INTERCEPT operator.

6. The method as described in claim 3 wherein the combination rules map the NOT logical operator to an SQL NOT IN operator.

7. The method as described in claim 2 wherein the relational database is DB/2.

8. The method as described in claim 1 further including the step of accessing the relational database using the single SQL query.

9. The method as described in claim 8 further including the step of returning a response to the single SQL query.

10. The method as described in claim 1 wherein the step of combining the SQL subqueries is carried out recursively until all filter elements of the filter query have been processed into the SQL query.

11. A method for searching a relational database from a Lightweight Directory Access Protocol (LDAP) directory service generating filter-based queries, comprising the steps of:

parsing an LDAP filter-based query for elements and logical operators of the LDAP filter query;

for each LDAP filter element, generating an SQL subquery according to a set of translation rules;

for each SQL subquery, generating a set of entry ID's for the LDAP filter query; and combining the SQL subqueries into a single SQL query according to a set of combination rules chosen corresponding to the logical operators of the LDAP filter query.

12. The method as described in claim 11 wherein the logical operators of the LDAP filter-based query include AND, OR and NOT.

13. The method as described in claim 12 wherein the combination rules map the OR logical operator to an SQL UNION operator.

14. The method as described in claim 12 wherein the combination rules map the AND logical operator to an SQL INTERCEPT operator.

15. The method as described in claim 12 wherein the combination rules map the NOT logical operator to an SQL NOT IN operator.

16. The method as described in claim 11 wherein the step of combining the SQL subqueries is carried out recursively until all filter elements of the filter query have been processed into the SQL query.

17. A computer program product in computer-readable media for searching a relational database using hierarchical, filter-based queries, comprising:
    means for parsing a filter-based query for elements and logical operators of the filter query;
    means for generating an SQL subquery for each filter element according to a set of translation rules;
    means for generating a set of entry ID's for each SQL subquery; and
    means for combining the SQL subqueries into a single SQL query according to a set of combination rules chosen corresponding to the logical operators of the filter query.

18. The computer program product as described in claim 17 wherein the filter-based query is a Lightweight Directory Access Protocol (LDAP) directory service query.

19. The computer program product as described in claim 18 wherein the logical operators of the LDAP filter-based query include AND, OR and NOT.

20. The computer program product as described in claim 19 wherein the combination rules map the OR logical operator to an SQL UNION operator.

21. The computer program product as described in claim 19 wherein the combination rules map the AND logical operator to an SQL INTERCEPT operator.

22. The computer program product as described in claim 19 wherein the combination rules map the NOT logical operator to an SQL NOT IN operator.

23. The computer program product as described in claim 18 wherein the relational database is DB/2.

24. A directory service, comprising:
    a directory organized as a naming hierarchy having a plurality of entries each represented by a unique identifier;
    a relational database management system having a backing store for storing directory data;
    means for searching the directory, comprising:
        means for parsing an hierarchical, filter-based query for elements and logical operators of the filter query;
        means for generating a relational database subquery for each filter element according to a set of translation rules;
        means for generating a set of unique identifiers for each relational database subquery; and
        means for combining the relational database subqueries into a single relational database query according to a set of combination rules chosen corresponding to the logical operators of the filter query.

25. The directory service as described in claim 24 wherein the directory is compliant with the Lightweight Directory Access Protocol (LDAP).

26. The directory service as described in claim 25 wherein the relational database management system is DB/2.

27. In a directory service having a directory organized as a naming hierarchy, the hierarchy including a plurality of entries each represented by a unique identifier, the improvement comprising:
    a relational database management system having a backing store for storing directory data;
    means for searching the directory, comprising:
        means for parsing an hierarchical, filter-based query for elements and logical operators of the filter query;
        means for generating a relational database subquery for each filter element according to a set of translation rules;
        means for generating a set of unique identifiers for each relational database subquery; and
        means for combining the relational database subqueries into a single relational database query according to a set of combination rules chosen corresponding to the logical operators of the filter query.

28. In the directory service as described in claim 27 wherein the directory is compliant with the Lightweight Directory Access Protocol (LDAP).

29. In the directory service as described in claim 28 wherein the relational database management system is DB/2.

* * * * *